United States Patent
Hayakawa et al.

(10) Patent No.: US 6,621,670 B2
(45) Date of Patent: Sep. 16, 2003

(54) GROUND FAULT PROTECTION CIRCUIT FOR DISCHARGE TUBE LIGHTING CIRCUIT

(75) Inventors: Kazuyuki Hayakawa, Gifu (JP); Ryoichi Uda, Gifu (JP)

(73) Assignee: Kabushiki Kaisha Sanyo Denki Seisakusho, Gifu (JP)

( * ) Notice: Subject to any disclaimer, the term of this patent is extended or adjusted under 35 U.S.C. 154(b) by 310 days.

(21) Appl. No.: 09/842,011

(22) Filed: Apr. 26, 2001

(65) Prior Publication Data

US 2001/0028543 A1 Oct. 11, 2001

(51) Int. Cl.[7] ................................................ H02H 3/16
(52) U.S. Cl. ....................................................... 361/42
(58) Field of Search ............................. 361/42, 43, 45, 361/46, 47, 49, 50

(56) References Cited

U.S. PATENT DOCUMENTS

| | | | | |
|---|---|---|---|---|
| 4,150,411 A | * | 4/1979 | Howell ........................ | 361/45 |
| 4,882,646 A | * | 11/1989 | Genuit ........................ | 361/42 |
| 5,089,752 A | * | 2/1992 | Pacholok .................... | 315/307 |
| 6,104,585 A | * | 8/2000 | Matsui et al. ................ | 361/38 |
| 6,347,025 B1 | * | 2/2002 | Ulrich et al. ................ | 361/42 |

* cited by examiner

Primary Examiner—Matthew V. Nguyen
(74) Attorney, Agent, or Firm—Connolly Dove Lodge & Hutz LLP (57) ABSTRACT

A step-up transformer is disposed on a wiring substrate 51 on which an inverter which converts a commercial a.c. power into a high frequency power and a ground fault detection circuit are mounted and within a casing 52. Lead wires 53, 54 which extend from the opposite ends of the secondary winding of the step-up transformer to the outside thereof are mounted upright on the wiring substrate 51. Coils 57, 58 are disposed on air-core bobbins 55, 56, which are threaded by the lead wires 53, 54. Outputs from the coils 57, 58 are fed to a ground fault detection circuit.

11 Claims, 8 Drawing Sheets

GROUND FAULT PROTECTION CIRCUIT FOR DISCHARGE TUBE LIGHTING CIRCUIT

FIELD OF THE INVENTION

The invention relates to a ground fault protection circuit for enhancing the safety in a neon transformer which is used for lighting a neon tube or an argon tube.

BACKGROUND OF THE INVENTION

Figure 1:
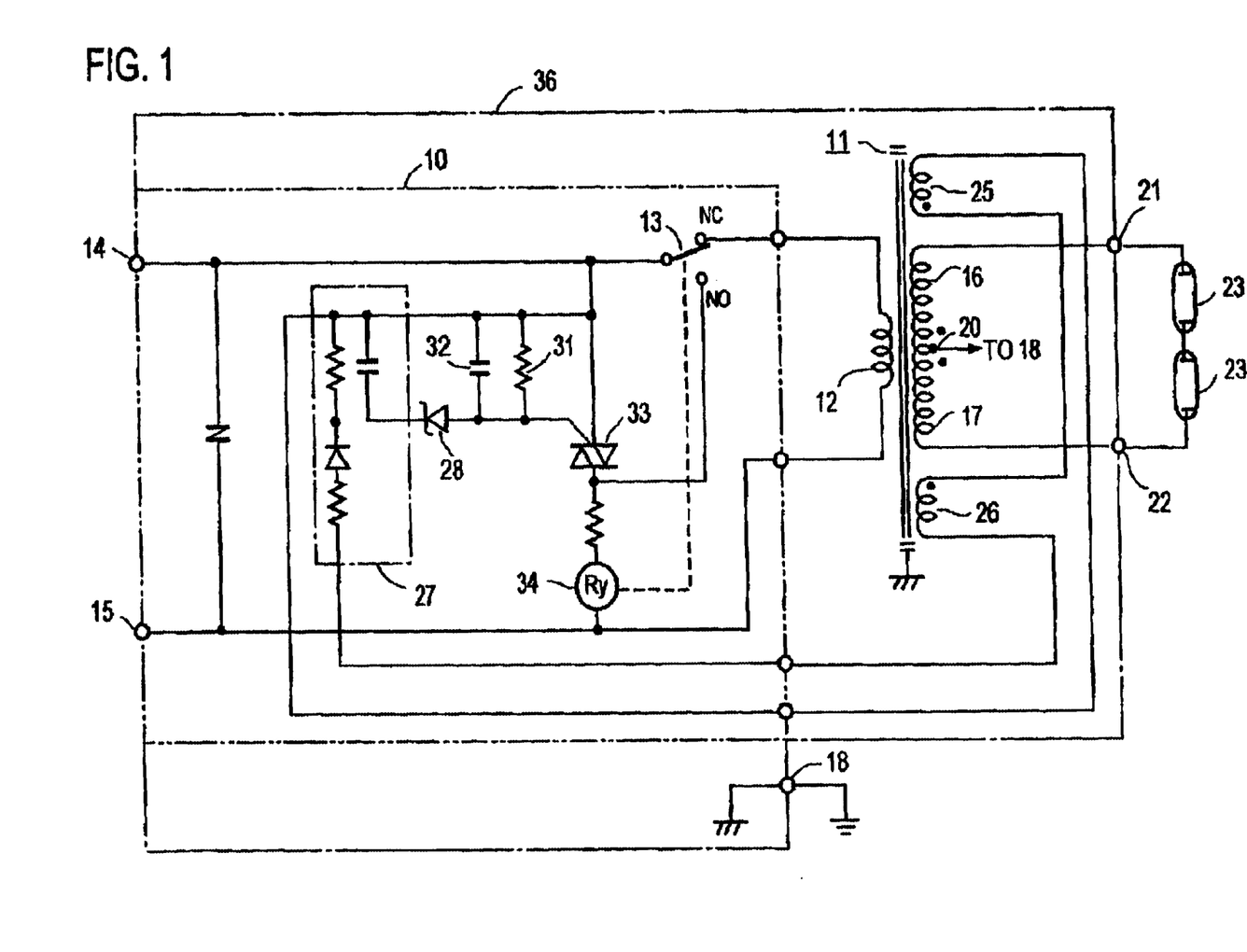
FIG. 1 is a circuit diagram of a conventional ground fault protection circuit.

FIG. 1 shows a ground fault detection circuit for a conventional neon transformer of the kind described. A leakage transformer (neon transformer) 11 includes a primary winding 12, one end of which is connected through a switch 13 to an input terminal 14 and the other end of which is connected to an input terminal 15. A pair of secondary windings 16, 17 have starting ends which are connected together at a junction 20, which is connected to a ground terminal 18 of a transformer casing 36 or thus to the casing 36. The ground terminal 18 is connected to the ground. Terminal ends of the both secondary windings 16, 17 are connected to output terminals 21, 22, across which sign lamps 23 such as neon tubes or argon tubes are connected. An a.c. power, for example, a commercially available power is applied across the input terminals 14, 15 and is stepped up by the transformer 11 before it is applied to the sign lamps 23 to light them.

A detection circuit 10 is provided which detects a ground fault which would occur if the sign lamp 23 or its wiring should come into contact with the casing 36 or a tower on which the sign lamps 23 are mounted and disconnects the input a.c. power. Specifically, the detection circuit 10 includes, as part thereof, tertiary windings 25, 26 disposed close to and magnetically coupled to the secondary windings 16, 17. Normally, the tertiary windings 25, 26 are disposed on a magnetic core on which the secondary windings 16, 17 are disposed in a manner such that a layer of insulating material having a high withstand voltage on the order of 6000–7000 V is located interposed between the tertiary windings 25, 26 and the lowermost layers of the secondary windings 16, 17 to provide a high electrical insulation therebetween while allowing a satisfactory magnetic coupling between the secondary windings 16, 17 and the tertiary windings 25, 26.

At their one end, the tertiary windings 25, 26 are connected together in an inverse phase relationship so that their induced voltages cancel each other, while at their other end, the tertiary windings 25, 26 are connected to an input of a rectifying and smoothing circuit 27, the output of which is connected through a Zener diode 28 across a parallel circuit comprising a resistor 31 and a capacitor 32 and which is in turn connected across the gate and the cathode of a triac 33. The triac 33 is connected across the input terminals 14, 15 through a relay drive coil 34, which when energized, controls relay contacts that define the switch 13.

Under a normal condition, voltages induced across the tertiary windings 25, 26 are substantially equal in magnitude but are opposite in phase, whereby an input voltage to the rectifying and smoothing circuit 27 is nearly zero. However, upon a ground fault of the signal lamps 23 or the wiring thereof, one of the secondary windings which is associated with the ground fault will be short-circuited, causing a substantially decrease in the induced voltage in the tertiary winding which is coupled with this secondary winding to allow the full induced voltage in the other tertiary winding to be applied to the rectifying and smoothing circuit 27. This voltage is rectified and smoothed and an increase in the rectified and smoothed output voltage turns Zener diode 28 on, with consequence that the triac 33 is turned on to energize the relay drive coil 34 to open the switch 13, thus interrupting the supply of the input a.c. power to the transformer 11. The switch 13 comprising the relay contacts is thrown to the normally open position NO, whereby the holding current to the relay drive coil 34 flows through the relay drive coil 34.

It will be noted that in the described conventional circuit, the pair of tertiary windings are used and disposed below (or inside) the lowermost layer of the pair of secondary windings with a high withstand voltage insulation. The provision of the tertiary windings requires time and labor, reducing the production efficiency of the neon transformer, in particular, for a step-up transformer in which the discharge tubes are lit by a high frequency power generated by an inverter. A reduced physical size of the transformer presents difficulties in winding the tertiary windings and the insulating film and treating lead wires.

Protection against a secondary ground fault of such a neon transformer is disclosed in FIG. 3 of the U.S. Pat. No. 5,847,909 issued Dec. 8, 1998, where the protection circuit does not employ tertiary windings, but uses an increased number of parts and results in a complicated arrangement, which renders it difficult to utilize a conventional box for containing a neon transformer. A ground fault protection circuit for a power supply transformer is also disclosed in U.S. Pat. No. 6,040,778 issued Mar. 21, 2000. However, this circuit also has a drawback of using a complex arrangement.

For a neon transformer, it is mandated by legal regulation that the ground terminal be always connected to the ground in view of the safety consideration. However, there is a likelihood that a dealer who undertakes constructing a neon sign or a neon tower which uses neon lamps may forget the work of connecting the ground terminal 18 to the ground. A no-ground connection protection circuit which detects such condition during use to interrupt the supply of the a.c. power is proposed and shown in FIG. 2 of above cited U.S. Patent. However, this no-ground connection protection circuit again requires an increased number of parts and results in a complicated arrangement, rendering it difficult to utilize a conventional box for containing a neon transformer.

It is an object of the invention to provide a ground fault protection circuit for a discharge tube lighting circuit having a reduced number of parts and a simple arrangement and which can be readily manufactured.

SUMMARY OF THE INVENTION

The present invention relates to a ground fault protection circuit for a circuit arrangement in which an input a.c. power is converted into a d.c. power in a rectifying and smoothing circuit, the d.c. power is then converted into a high frequency power by an inverter including the primary winding of a step-up transformer, and the high frequency power is stepped up by the step-up transformer to light a cold cathode discharge tube connected across the opposite ends of a secondary winding thereof. According to a first aspect of the invention, a first and a second coil are disposed so as to be threaded by lead wires extending from the opposite ends of the secondary winding of the step-up transformer and are connected to a detection circuit which detects a ground fault occurring on the output side of the secondary winding. An interruption circuit is controlled in response to a ground fault detection output from the detection circuit, thereby interrupting the supply of the high frequency power to the secondary winding.

According to a second aspect of the invention, a resistive element is connected between the magnetic core of the step-up transformer and a point of common potential, and a detection circuit is connected across the resistive element to deliver a ground fault detection output whenever a high frequency voltage across the resistive element becomes equal to or greater than a given value, thus allowing an interrupter circuit to be controlled by the ground fault detection output to interrupt the supply of the high frequency power to the secondary winding.

DETAILED DESCRIPTION OF EMBODIMENTS

Figure 2:
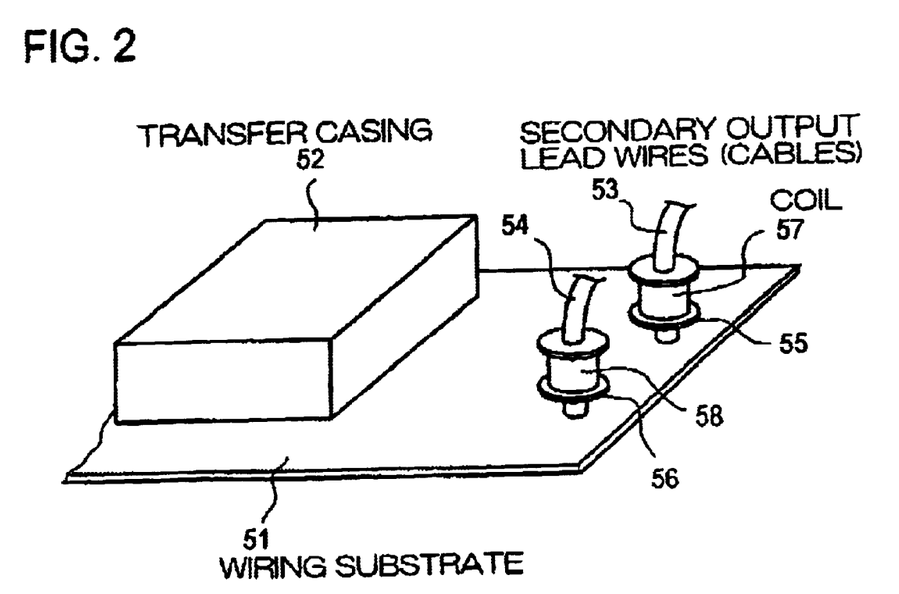
FIG. 2 shows an exemplary appearance of coils 57, 58 mounted for detecting a ground fault according to an embodiment of the invention.

FIG. 2 shows an embodiment of the invention. Disposed on a wiring substrate 51 is a step-up transformer 11 (mentioned above), not shown, which is covered by a casing 52. Also disposed on the wiring substrate 51 are an inverter which converts commercial a.c. power into a high frequency power and a ground fault detection circuit, which are not shown. Secondary output lead wires (cables) 53, 54 which convey a high voltage output from the step-up transformer 11 to the outside extend upright from the wiring substrate 51.

In this embodiment, a first and a second coil 57, 58 are wound around air-core bobbins 55, 56, respectively, which are threaded by the lead wires 53, 54, thus achieving an electrostatic coupling between the first and the second coil 57, 58 and the lead wire 53, 54. It is to be noted that the opposite ends of the first and the second coil 57, 58 are connected to a ground fault detection circuit, not shown, which is formed on the wiring substrate 51. It is desirable that the first and the second coil 57, 58 have a number of turns, for example, 1000 turns so as to be disposed in as many layers as possible to provide a high output, which may be on the order of 10V, for example.

Figure 3:
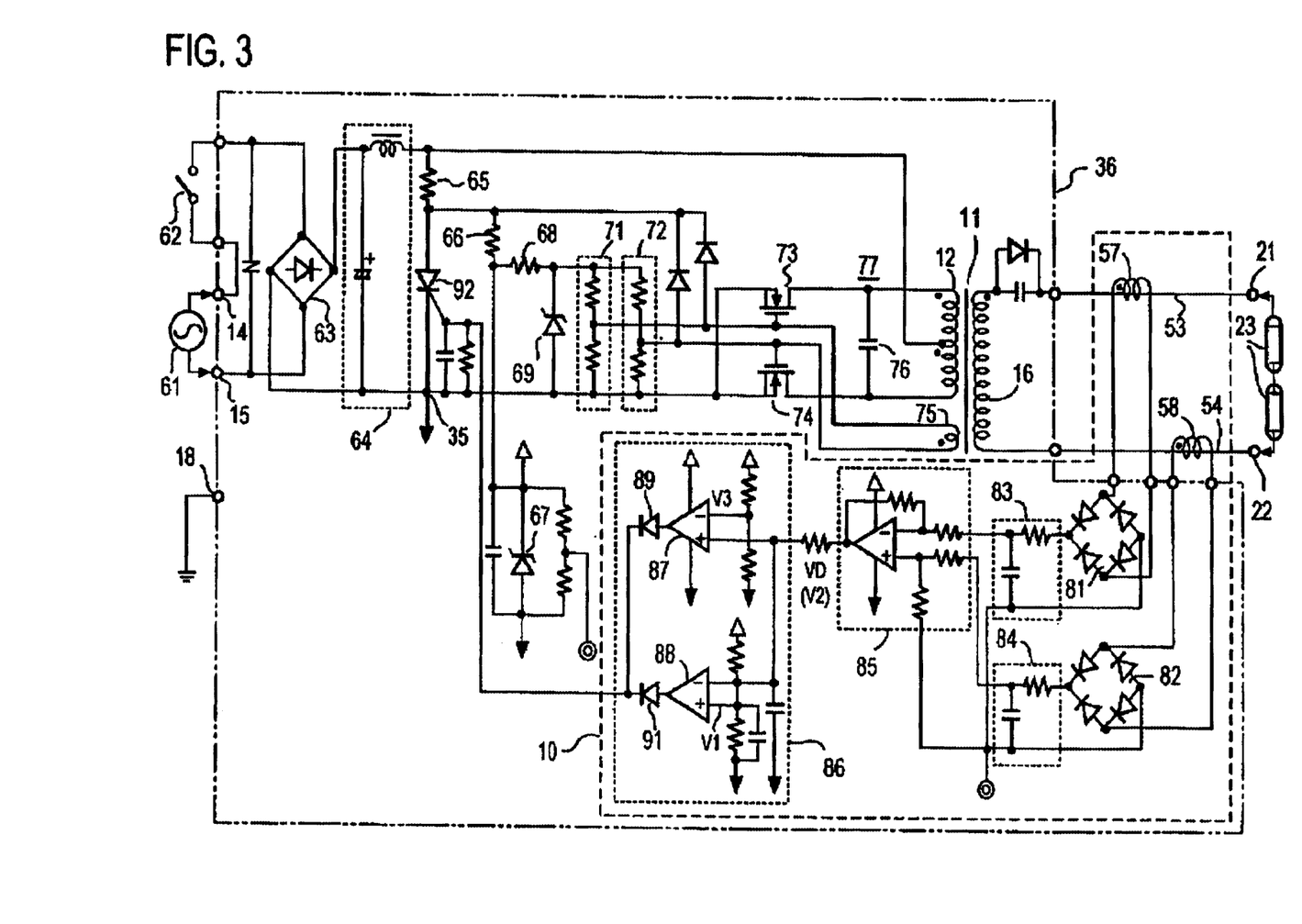
FIG. 3 is a circuit diagram of an embodiment of the invention.

FIG. 3 shows an example of a cold cathode discharge tube lighting circuit to which the present invention is applied. In this instance, a commercial power is converted into a high frequency power, which is used to light a cold cathode discharge tube. Input terminals 14, 15 which are to be connected to a commercial power supply 61 are connected through a power switch 62 to an input of a full wave rectifier circuit 63, an output of which is connected to a smoothing circuit 64. One end each of the input and the output of the smoothing circuit 64 are connected to a point of common potential 35 of the circuit, while the other end of the output is connected to the middle point of the primary winding 12, and is also connected through resistive elements 65, 66 to one end of a Zener diode 67, the other end of which is connected to the point of common potential 35. A voltage across the Zener diode 67 is divided by a resistive element 68 and a Zener diode 69, and voltage dividing resistors 71, 72 are connected across the Zener diode 69. Each point in the voltage dividing resistors 71, 72 where a divided voltage is obtained is connected to the gate of one of switching elements 73, 74 comprising FET's to apply a given bias voltage thereto, and is also connected to one end of a feedback winding 75 which is magnetically coupled to the primary winding 12.

The opposite ends of the primary winding 12 are connected to the point of common potential 35 through the respective switching elements 73, 74, and a capacitor 76 is connected across the primary winding 12. A combination of the primary winding 12, the switching elements 73, 74, the feedback winding 75 and the capacitor 76 forms a self-excited oscillator circuit (push-pull inverter) 77, which develops a high frequency signal on the order of 10 kHz to 30 kHz, for example. The high frequency signal is stepped up to appear as a high voltage output across a secondary winding 16 to be applied across discharge tubes 23 for lighting them.

Each output from the coils 57, 58 which are electrostatically coupled to the lead wires 53, 54 extending between the opposite ends of the secondary winding 16 and output terminals 21, 22 is supplied to full wave rectifier circuits 81, 82. The rectified output from each of the rectifier circuits 81, 82 is smoothed by smoothing circuits 83, 84, respectively, and both smoothed outputs are applied to a difference circuit 85 where a difference voltage $V_D$ therebetween is detected. The difference voltage $V_D$ is fed to a window comparator 86. Specifically, the difference voltage $V_D$ is applied to a non-inverting input terminal of a comparator 87 to be compared against a reference voltage V3, and is also applied to an inverting input terminal of a comparator 88 to be compared against a reference voltage V1. Outputs from the comparators 87, 88 are passed through reverse flow blocking diodes 89, 91 to be applied to the gate of a thyristor 92, which is connected between a junction between the resistive elements 65, 66 and the point of common potential 35.

Figure 4:
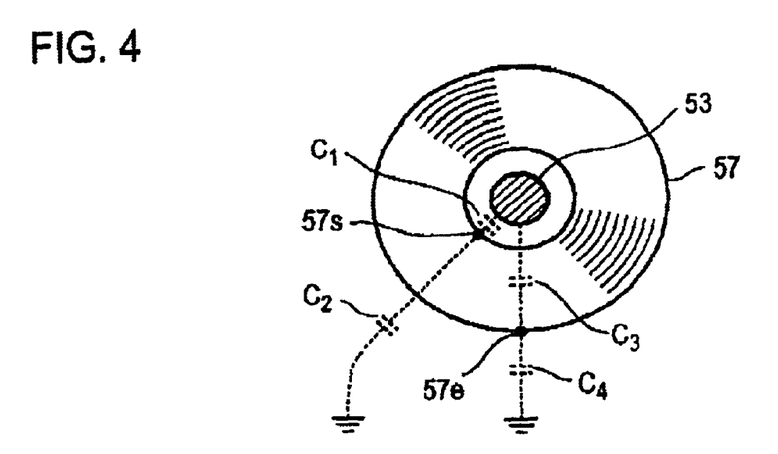
FIG. 4 is an illustration of a high frequency voltage which is induced across the coil 57 shown in FIG. 3.

As mentioned previously, a high frequency, high voltage appears across the secondary winding 16 of the transformer 11. As a consequence, there occurs a leakage of the high frequency voltage from the cables 53, 54 through the coils 57, 58 to the ground by way of floating capacitances. By way of example, FIG. 4 shows that a starting end 57s of the coil 57 which is located close to the cable 53 exhibits a floating capacity C, with respect to the cable 53 and a floating capacitance $C_2$ with respect to the ground. Accordingly, a voltage $V_a$ on the cable 53 is divided in accordance with the ration between $C_2$ and $C_1$, and a divided voltage $V_s$ appears at the starting end 57s of the coil 57. Similarly, a voltage $V_e$ which results from dividing the voltage $V_a$ in accordance with the ratio between a floating capacitance $C_4$ between the terminal end 57e and the ground and a floating capacitance $C_3$ between the terminal end 57e and the cable 53 appears at the terminal end 57e of the coil 57. Since $C_1>C_3$ and $C_2<C_4$, we have $V_e>V_s$. It will be seen from this description that the greater the number of winding layers in the coil 57, the greater the difference between $V_e$ and $V_s$, facilitating the detection of the voltage V on the cable 57.

In the absence of a ground fault from the secondary wiring of the transformer 11 or the discharge tubes 23, there occurs an alternation in the potential from $+V_A$ to $-V_A$ on one end and from $-V_A$ to $+V_A$ on the other end of the secondary winding 16 at a high frequency, while the potential at the middle point of the secondary winding 16 remains to be zero. At this time, the voltages across the coils 57, 58 are equal to each other. However, if a ground fault occurs in the wiring associated with the cable 53, for example, the point of fault assumes a zero potential, or the end of the secondary winding 16 associated with the cable 53 remains to be zero potential while the end of the of the secondary winding 16 associated with the cable 54 undergoes an alternation in the potential from $+2V_A$ to $-2V_A$ and vice versa repeatedly at a high frequency. The resulting voltage across the coil 57 remains to be zero while the voltage across the coil 58 is substantially equal to $2(V_e-V_s)$.

As described, during a normal condition, voltages of an equal magnitude is induced across the first and the second coil 57, 58, and accordingly, the output voltage $V_D$ from the difference circuit 85 assumes a virtual zero potential V2. Hence, reference voltages V1 and V3 are chosen such that for the difference voltage $V_D$=V2, the reference voltage V3 of the comparator 87 is greater while the reference voltage V1 of the comparator 88 is less, thus achieving V1<V2<V3. As a result, the outputs from the comparators 87, 88 are negative voltages, and no voltage is applied to the gate of the thyristor 92 which is effective to render it conductive, whereby the thyristor 92 remains non-conductive. Accordingly, the inverter 77 is in oscillation, and the power from the commercial power supply 61 is converted into a high frequency power to allow the discharge tubes 23 to be lit.

However, if a wiring associated with the lead wire 53, the discharge tube or the junction of the wiring moves into contact with a structural member with a neon tower, for example, to cause a ground fault, the lead wire 53 assumes a zero potential, the potential at each end of the first coil 57 is also substantially zero, and the voltage induced across the first coil 57 is substantially zero. On the other hand, the potential on the lead wire 54 alternates between a positive and a negative $2V_A$ at a high frequency, and the voltage induced across the second coil 58 increases to a greater value $2(V_e-V_s)$, whereby an output voltage from the smoothing circuit 84 becomes significantly greater than an output voltage from the smoothing circuit 83. The output voltage $V_D$ from the difference circuit 85 assumes a relatively large positive value. The positive value $V_D$ is greater than the reference voltage V3, whereupon an output from the comparator 87 becomes positive, and a positive voltage is applied to the gate of the thyristor 92 to render it conductive, whereby the bias applied to the gates of the switching elements 73, 74 is rendered to be zero, causing the inverter 77 to cease operation, and no high frequency, high power appears across the secondary winding 12.

If the discharge tube, the wiring or a junction associated with the lead wire 54 moves into contact with a structural member of a neon tower, for example, the lead wire 54 assumes a ground potential, and the voltage induced across the second coil 58 is reduced, while the voltage induced across the first coil becomes greater, whereby the output voltage $V_D$ from the difference circuit 85 is a relatively large negative voltage which is less than the reference voltage V1, causing the output of the comparator 88 to assume a positive potential, which is applied to the gate of the thyristor 92 to render it conductive, thus ceasing the oscillation of the inverter 77.

In this manner, in the event of a ground fault, this is detected to interrupt the supply of the high frequency power to the output terminals 21, 22, thus preventing casualty from occurring.

Figure 5:
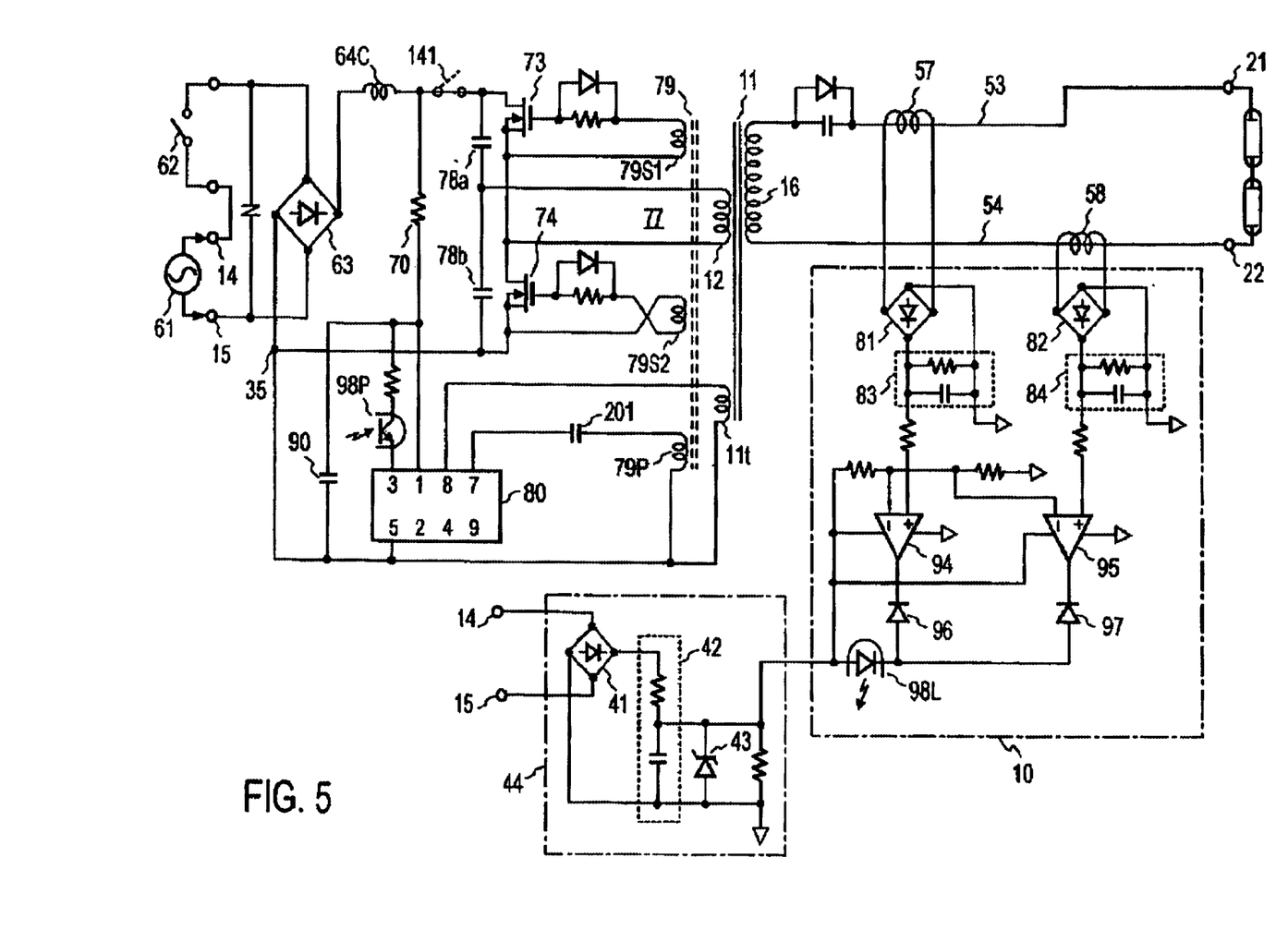
FIG. 5 is a circuit diagram of another embodiment of the invention.

The inverter 77 is not limited to one which comprises two switching elements, but may comprise four such elements, and is not limited to a self-excited type, but may be a separately excited type. FIG. 5 shows an example of an inverter 77 which is constructed as a separately excited type, and corresponding parts to those shown in FIG. 3 are designated by like reference characters in FIG. 5 as used in FIG. 3. An output of a rectifier circuit 63 is connected through a choke coil 64c to a series circuit of capacitors 78a–78b which is shunted by a series circuit of FET's 73 and 74 which function as switching elements. Secondary wirings 79S1, 79S2 of a pulse transformer 79 are connected between the gate and source of FET's 73 and 74, respectively. The primary winding 12 of the transformer 11 is connected between the junction between the capacitors 78a and 78b and the junction between FET's 73 and 74. The secondary windings 79S1 and 79S2 are connected to the FET's 73 and 74, respectively, in opposite polarities.

An oscillation controlling integrated circuit 80 has a pin No. 1 which is connected through a resistive element 70 to a junction between the choke coil 64c and the capacitor 78a, while a negative output 35 of the rectifier circuit 63 is connected to a pin No. 5 of the integrated circuit 80. A capacitor 90 is connected between the pins No. 1 and No. 5 of the integrated circuit 80, and a tertiary winding 11t which is magnetically coupled with the primary winding 12 is connected between pins No. 8 and No. 5 of the integrated circuit 80. The primary winding 79P of the pulse transformer 79 is connected through a capacitor 201 between pins No. 7 and No. 5. The integrated circuit 80 contains an oscillation circuit, an oscillation output of which is applied across the primary winding 79P of the pulse transformer 79. Depending on the polarity of the pulse which is applied across the primary winding 79p, the pulses which are induced across the secondary windings 79S1 and 79S2 cause one of the FET's 73, 74 to be turned on and the other to be turned off in an alternate fashion, whereby the charge from the capacitor 78a or 78b flows alternately and in opposite directions through the primary winding 12, allowing the output from the rectifier circuit 63 to be converted into high frequency power, which is stepped up by the transformer 11 to induce a voltage across a secondary winding 16. Part of the high frequency power is fed back to the integrated circuit 80 through the tertiary winding 11t, thus feeding an operating power to the integrated circuit 80.

In accordance with the present invention, rather than detecting a difference between voltages induced across the coils 57, 58, the magnitude of each voltage induced across the coils 57, 58 may be detected and if such magnitude is found to be abnormal, the supply of the high frequency power to the secondary side of the step-up transformer 11 may be interrupted. This is illustrated in FIG. 5 where voltages induced across the first and the second coil 57, 58 are rectified and smoothed in the similar manner as in the embodiment shown in FIG. 3, but in this embodiment, the rectified and smoothed outputs are compared against a reference voltage VS1 in comparators 94, 95, respectively. During a normal operation, a voltage of a certain magnitude ($V_e-V_s$) is induced across each of the coils 57, 58, as mentioned previously, and a reference voltage VS1 is chosen to be less than the voltage ($V_e-V_s$). Accordingly, the outputs from the comparators 94, 95 assume positive potentials, which are blocked by diodes 96, 97, preventing a current flow through a light emitting element 98L of a photocoupler 98. The photocoupler 98 includes a light receiving element 98P which is connected between a junction between the resistive element 70 and the capacitor 90 and a pin No. 3 of the integrated circuit 80 and which does not conduct at this time, whereby the integrated circuit 80 continues a control operation over the FET's 73, 74, allowing high frequency power to be supplied to the secondary winding 16.

However, in the event of a ground fault, a voltage induced across either coil 57 or 58 which is associated with the fault assumes a substantially zero value, whereupon the input to either comparator 94 or 95 becomes less than the reference voltage VS1 to deliver an output of a low level to enable either diode 96 or 97 to conduct to pass a current through the light emitting element 98L. Upon light emission, the light is received by the light receiving element 98P, which then becomes conductive to allow a positive voltage to be applied to the pin No. 3 of the integrated circuit 80 through the light receiving element 98P, thus ceasing the operation of the integrated circuit 80. Accordingly, the FET's 73, 74 are no longer subject to the switching control, whereby the supply of the high frequency power to the secondary winding 16 is interrupted.

In this instance, the commercial power supplied to the input terminals 14, 15 is rectified in a full wave rectifier circuit 41, and the rectified output is smoothed in a smoothing circuit 42, an output from which is applied to a Zener diode 43 to form a power supply circuit 44. An output from the power supply circuit 44 or the voltage across the Zener diode 43 is applied to operating power supply terminals of the comparators 94, 95.

Figure 11:
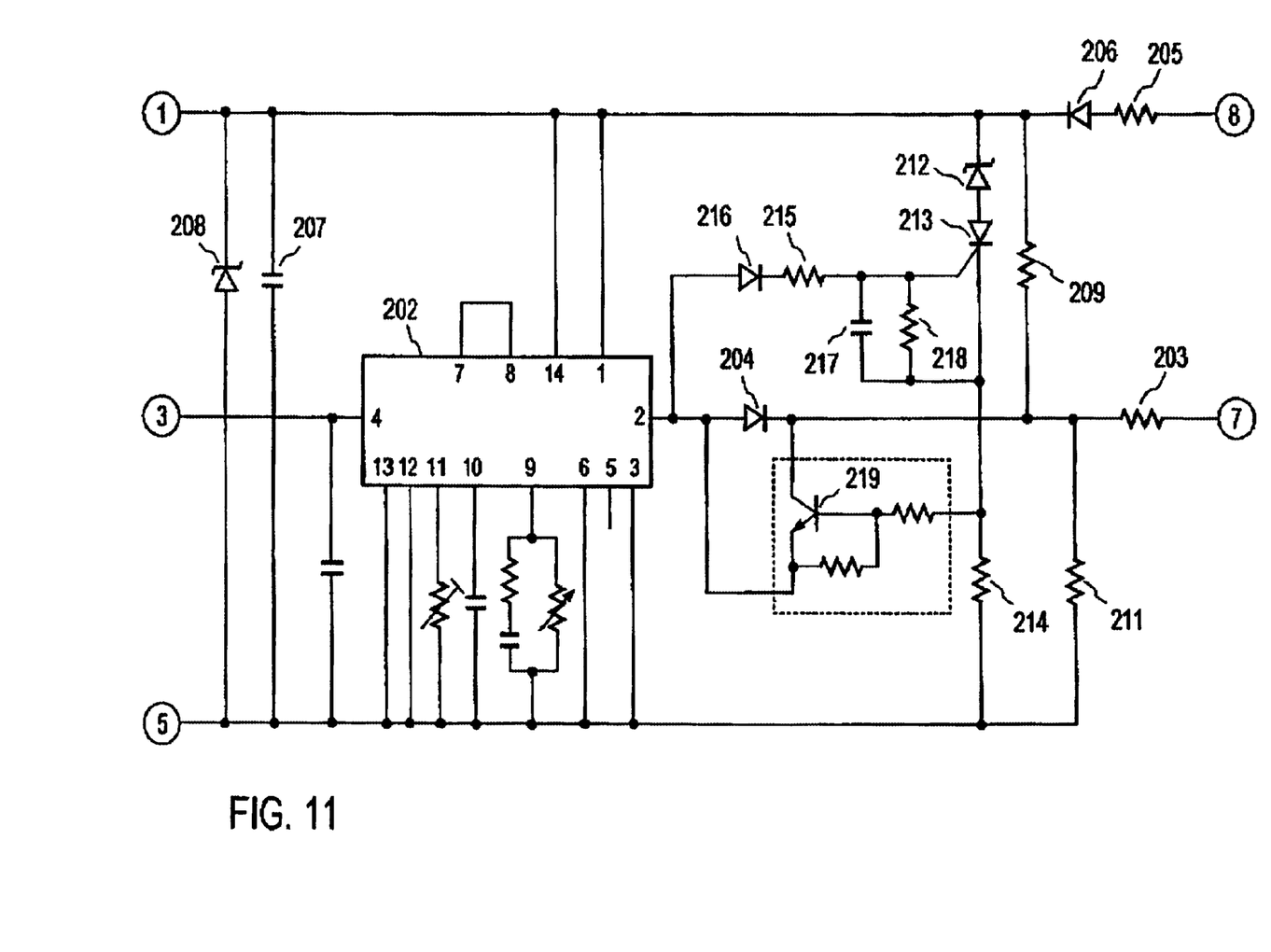
FIG. 11 is a circuit diagram of a specific example of a semiconductor integrated circuit 80 shown in FIG. 5.

As illustrated in FIG. 11 as an example, the semiconductor integrated circuit 80 comprises a commercially available switching regulator control semiconductor integrated circuit 202 (such as M51996A available from Mitsubishi Electric, for example) into which additional elements are assembled to form a single package. Specifically, the pin No. 1 of the integrated circuit 80 or ① is connected to pins No. 1 and No. 14 of the integrated circuit 202, the pin No. 3 of the integrated circuit 80 or ③ is connected to a pin No. 4 of the integrated circuit 202, the pin No. 5 of the integrated circuit 80 or ⑤ is connected to pins No. 3, No. 6, No. 12 and No. 13 of the integrated circuit 202, the pin No. 7 of the integrated circuit 80 or ⑦ is connected to a pin No. 2 of the integrated circuit 202 through a resistive element 203 and a diode 204, and the pin No. 8 of the integrated circuit 80 or ⑧ is connected to pins No. 1 and No. 14 of the integrated circuit 202 through a resistive element 205 and a diode 206. A capacitor 207 and a Zener diode 208 are connected across the pin ① and pin ⑤, and a junction between the resistive element 203 and the diode 204 is connected to the pins ③ and ⑤ through resistive elements 209 and 211, respectively. A series combination of a Zener diode 212, a thyristor 213 and a resistive element 214 is connected between the pins ③ and ⑤. The gate of the thyristor 213 is connected to the pin No. 2 of the integrated circuit 202 through a resistive element 215 and a diode 216, and a parallel circuit of a capacitor 217 and a resistive element 218 is connected between the gate and the cathode of the thyristor 213. A transistor 219 is connected across the anode and cathode of the diode 204 in reverse polarity, with the base of the transistor 219 being connected to the cathode of the thyristor 213.

Part of the high frequency power applied to the transformer 11 is input to the pin ⑧ through the tertiary winding 11t and is rectified by the diode 206, the rectified output being fed to the power supply pin of the integrated circuit 202 through the capacitor 207 and the Zener diode 208 as a constant supply voltage. A pulse output from the integrated circuit 202 comprises a positive pulse which is passed through the diode 204 to be fed to the primary winding 79p of the pulse transformer, whereupon it is caused by the capacitor and the resistive element to render the thyristor 213 conductive, which is effective to make the transistor 219 conductive, thus allowing the charge of the capacitor 201 to be discharged through the transistor 219. This delayed operation assures that the switching control over the FET's 73, 74 does not become unstable upon commencement of the operation.

Figure 6:
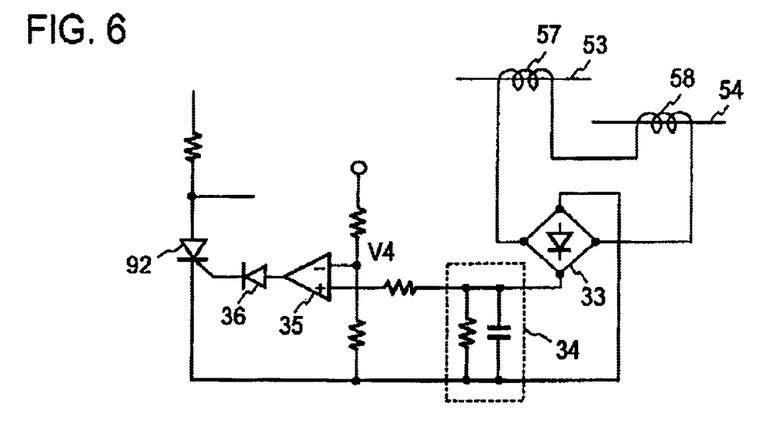
FIG. 6 is a circuit diagram of an essential part of a further embodiment of the invention.

As partly shown in FIG. 6, ends of the coils 57 and 58 which are of the same polarity may be connected together, and the series combination of the coils 57 and 58 may be connected to the fill wave rectifier circuit 33. The rectified output is smoothed in the smoothing circuit 34 to be fed to the comparator 35 so as to be compared against a reference voltage V4. During a normal condition when there is no ground fault, a voltage equal to ($V_e-V_s$) is developed across each of the coils 57, 58, as mentioned previously, whereby the voltage across the series combination of the coils 57 and 58 is substantially equal to zero as a result of cancellation. Accordingly, the rectified and smoothed output voltage is equal to zero or very small and is less than the reference voltage V4, and accordingly, the output from the comparator 35 assumes a negative potential, applying no voltage to the gate of the thyristor 92 which is effective to render it conductive. As a consequence, the inverter 77 shown in FIG. 3, which is not illustrated in FIG. 6, does not cease to operate, supplying the high frequency power to the secondary winding 16.

However, in the event of a ground fault on one of the lead wires 53, 54, a voltage induced across one of the coils 57, 58 becomes substantially equal to zero while a voltage equal to 2($V_e-V_s$) is induced across the other coil, and a corresponding rectified and smoothed output becomes greater than the reference voltage V4, causing the output from the comparator 35 to assume a positive potential to apply a positive voltage to the gate of the thyristor 92 which renders it conductive, thus causing the thyristor 92 to conduct. As a consequence, a gate bias to the FET's 73, 74, which are not shown in FIG. 6, but illustrated in FIG. 3 becomes equal to zero, ceasing the oscillation of the inverter 77 to interrupt the supply of the high frequency power to the secondary winding 16.

It will also be readily seen that the coils 57 and 58 may be connected in series, and a voltage across the series circuit may be rectified and smoothed to be compared against a reference voltage, and a result of comparison may be used to cease or control the operation of the integrated circuit 80 shown in FIG. 5 in accordance with the presence or absence of a ground fault. It will also be readily seen that the voltages induced across the coils 57, 58 may be separately rectified and smoothed, a difference therebetween is formed and compared in the window comparator 86 in the manner illustrated in FIG. 3, thus using a result of such comparison to cease or control the operation of the integrated circuit 80 shown in FIG. 5 in accordance with the presence or absence of a ground fault. In addition, it will also be readily seen that the voltages induced across the coils 57, 58 may be rectified and smoothed and compared against a reference value separately in the manner illustrated in FIG. 5, and a result of such comparison may be used to control ceasing the oscillation of the inverter 77 shown in FIG. 3 in accordance with the presence or absence of a ground fault.

In these embodiments, the first and second coil 57, 58 which are used to detect a ground fault are electrostatically coupled to the lead wires 53, 54 which feed the high voltage output to the outside circuit, and hence there is no need to provide tertiary windings 21, 22 on the step-up transformer 11, thus greatly simplifying the manufacture of the step-up transformer 11. The first and the second coil 57, 58 may be manufactured concurrently with the step-up transformer 11, and may be threaded over the external lead wires 53, 54, and thus their assembly is very simple. The elimination of the tertiary windings 21, 22 from the step-up transformer 11 contributes to greatly facilitating the production of the step-up transformer 11 which is used in a lighting circuit of inverter type because of the reduced physical size thereof.

A further embodiment of the invention will now be described with reference to FIG. 7 where the parts corresponding to those shown in FIGS. 1 to 5 are designated by like reference characters as used before.

A series combination of a resistor 65, a diode 101 and a capacitor 102 is connected between a junction between a smoothing circuit 64 and a primary winding 12 and a junction between a rectifier 63 and FET's 73, 74. A junction between the diode 101 and capacitor 102 is connected through a resistor 103 to one end of resistive voltage dividers 71, 72, the other end of which is connected to the junction between the rectifier 63 and the FET's 73, 74 or a point of common potential 104 of the circuit.

Figure 7:
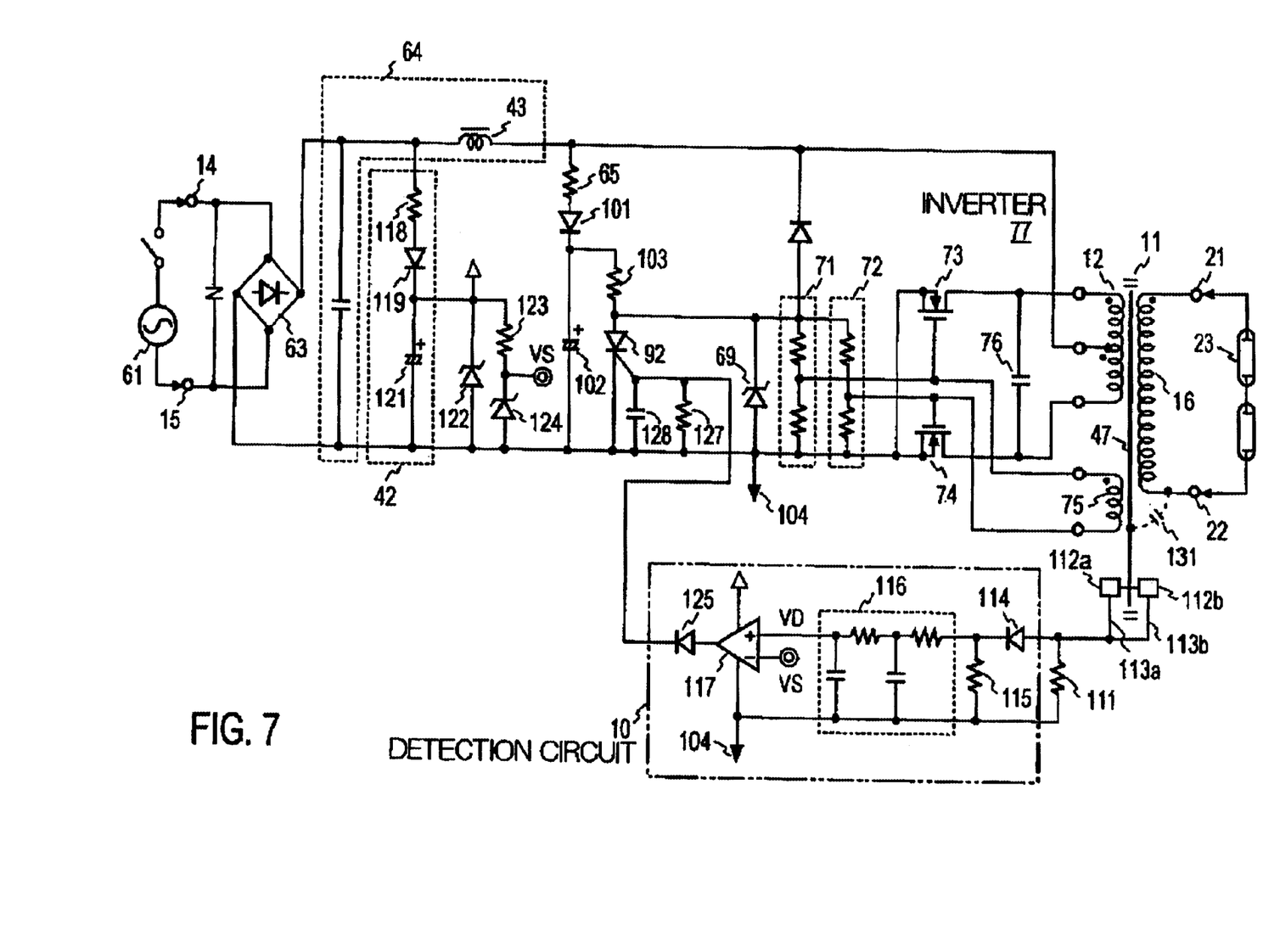
FIG. 7 is a circuit diagram of yet another embodiment of the invention.
Figure 8:
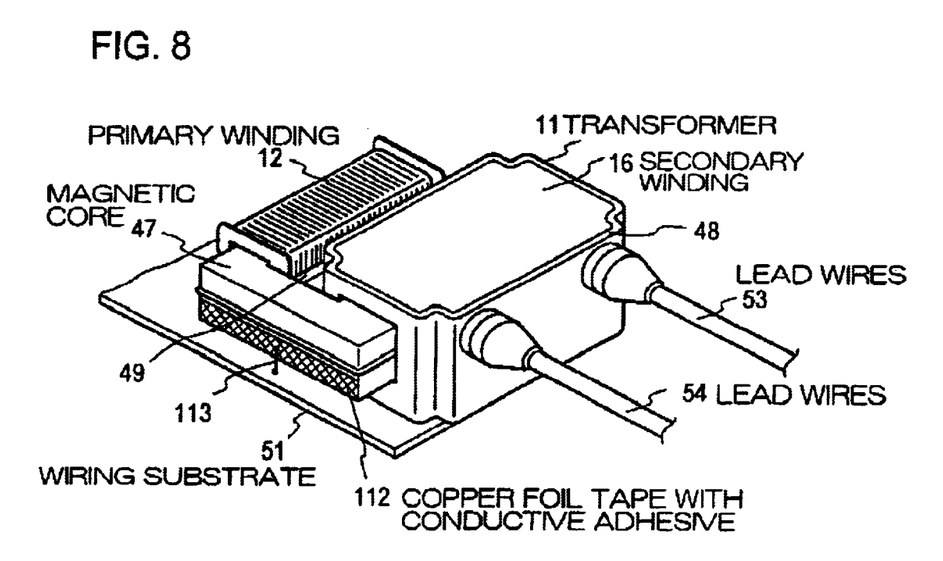
FIG. 8 is a perspective view of a specific example of connecting a resistive element in the embodiment shown in FIG. 7.

As shown in FIG. 8, the transformer 11 is mounted on the wiring substrate 51 on which the inverter 77 is mounted. The transformer 11 is in the form of a rectangular frame formed by a pair of magnetic cores such as U-shaped ferrite cores disposed in abutment against each other. The primary winding 12 is disposed on one limb of the frame-shaped magnetic core 47, and the secondary winding is disposed on the opposite limb. The secondary winding 16 is not shown in this Figure since it is covered by a casing 48 which retains the leads of the lead wires 53, 54. While not shown, a feedback winding 75 is also disposed on the magnetic core 47. A leakage magnetic core 49 is disposed between the primary winding 12 and secondary winding 16 and is connected to the magnetic core 47. The transformers 11 shown in FIGS. 1, 3, 4, 5 and 7 also represent a leakage transformer including such a leakage magnetic core, even though this has not been specifically described.

In this embodiment, a resistive element 111 is connected between the magnetic core 47 and a point of common potential 104 of the circuit (see FIG. 7). In FIG. 8, a copper foil tape 112 with a conductive adhesive is applied to a lateral surface of the magnetic core 47, and is connected to one end of a lead wire 113, the other end of which is connected to one end of the resistive element 111 (not shown in FIG. 8) which is formed on the wiring substrate 51, whereby the other end of the resistive element 111 is connected to the point of common potential 104 of the wiring substrate 51 as shown in FIG. 7. It should be understood that this cannot be seen in FIG. 8 because it is formed on the back side of the wiring substrate 51.

In the embodiment of FIG. 7, copper foil tapes 112a, 112b are applied to the magnetic core 47 at two locations and are connected to one end of the resistive element 111 through lead wires 113a, 113b.

In the detection circuit 10, a high frequency voltage developed across the resistive element 111 is rectified by a rectifier 114 to be fed to a rectifier load resistive element 115, and the rectified output is passed through a CR low pass filter 116 to provide a d.c. output, which is in turn supplied to a non-inverting input terminal of a comparator 117. A referecnce VS is applied to the inverting input terminal of the comparator 117. Specifically, a series circuit including a resistive element 118, a diode 119 and a capacitor 121 is connected across the output of the full wave rectifier 63, the capacitor 121 is shunted by a Zener diode 122, across which a series circuit including a resistive element 123 and a Zener diode 124 is connected, the Zener diode 124 providing a constant voltage which is supplied as the reference voltage VS to the inverting input terminal of the comparator 117.

When the ground fault detection circuit detects the occurrence of a ground fault, a high level output from the comparator 117 is passed through a reverse flow blocking diode 125 to the gate of the thyristor 92. The thyristor 92 has an anode which is connected to the junction between a resistive element 103 and a voltage divider 71 and a cathode which is connected to the point of common potential 104 of the circuit. A parallel circuit including a resistive element 127 and a capacitor 128 is connected between the gate and the cathode of the thyristor 92.

With the described arrangement, during a normal condition, a high frequency, high voltage is developed across the secondary winding 16 with the middle point assuming a substantially zero voltage and the opposite ends assuming a maximum positive and negative voltage of 4 kV and a maximum negative and positive voltage of 4 kV, respectively, for example. The high frequency, high voltage induces a high frequency voltage across the magnetic core 47 through a capacitance 131 formed between the magnetic core 47 and the secondary winding 16 of the transformer 11, and the induced high frequency voltage is applied to the resistive element 111 through the leads 113 (113a, 113b). During a normal condition, the voltage induced across the magnetic core 47 corresponds to ±4 kV in the example given above, and the reference voltage VS is chosen such that the output voltage VD which results from the voltage across the resistive element 111 at as it is rectified is less than the reference voltage VS of the comparator 117. Accordingly, an output from the comparator 117 assumes a low level, the thyristor 92 remains non-conductive, and the inverter 77 operates normally, allowing the high frequency power to be applied to the discharge tubes 23 to maintain them lit.

However, in the event of occurrence of a ground fault of the secondary output of the transformer 11, or the discharge tube 23 or other wirings, for example, if a ground fault of the output terminal 21 occurs, the high frequency, high voltage induced across the secondary winding 16 will assume a zero voltage at its end close to the output terminal 21 while the other end of the secondary winding 16 assumes a maximum value of ±8 kV in the example given above, which is double the voltage assumed during the normal condition. Accordingly, the high frequency voltage which corresponds to such magnitude is induced across the magnetic core 47, and a voltage which is applied to the resistive element 111 will be doubled as compared during the normal condition as is the d.c. output voltage VD supplied to the comparator 117 which is doubled as compared during the normal operation, thus exceeding the reference voltage VS, whereby an output from the comparator 117 assumes a high level, which is then applied to the gate of the thyristor 92 to turn it on, thus short-circuiting the voltage dividers 71, 72 to null the bias applied to the gates of FET's 73, 74, disabling the inverter 17 to oscillate and ceasing to deliver the high frequency, high power.

Since the present invention is designed to detect the magnitude of the high frequency voltage which is induced across the magnetic core 47 through a capacitance, it is not always necessary to use the copper foil tape 112. The only requirement is that the high frequency voltage which is induced across the magnetic core 47 be supplied to the resistive element 111. In addition, the inverter 77 need not be a two switching element arrangement, but a four switching element arrangement may also be used, and it need not be self-excited type, but may be a separately excited type as illustrated in FIG. 5.

It is to be noted that the present embodiment is designed to detect the magnitude of a high frequency voltage which is electrostatically induced across the magnetic core, and since the magnitude is subject to a two-fold change depending on the presence or absence of the ground fault, a choice of the reference voltage VS is facilitated and the ground fault can be detected in a reliable manner. Because the tertiary winding is not used, the manufacture of the transformer is simplified, thus improving the productivity.

In the embodiments shown in FIGS. 3, 5, 6 and 7, the supply of the high frequency power to the secondary winding 16 may be interrupted by interrupting the d.c. power which is fed to the inverter 77 in response to the detection of a ground fault. By way of example, as partly shown in FIG. 9, a relay operated switch 141 may be connected between the positive output terminal of the smoothing circuit 64 and the middle point of the primary winding 12 which forms part of the inverter 77, and a series circuit of a photo-triac 98P operating as a light receiving element of a photocoupler 98 and a relay drive coil 142 may be connected across the both output terminals of the smoothing circuit 64 so that when a ground fault detecting output is delivered from the detection circuit shown in FIG. 5, for example, light emitted from a light emitting element 98L of the photocoupler 98 impinges upon the photo-triac 98P to render it conductive to energize the relay drive coil 142, whereupon the relay operated switch 141 is thrown from its normally closed contact NC to its normally open contact NO to interrupt the d.c. power fed to the inverter 77 to interrupt the supply of the high frequency power to the secondary winding 16 of the transformer 11 while maintaining a self-holding current through the relay drive coil 142. In order to achieve the interruption of d.c. power in response to the detection of the ground fault in the embodiment shown in FIG. 5, a switch 141 may be connected between a junction between the choke coil 64c and the resistive element 70 and the junction between the capacitor 78a and the FET 73, for example, as indicated in broken lines.

Figure 9:
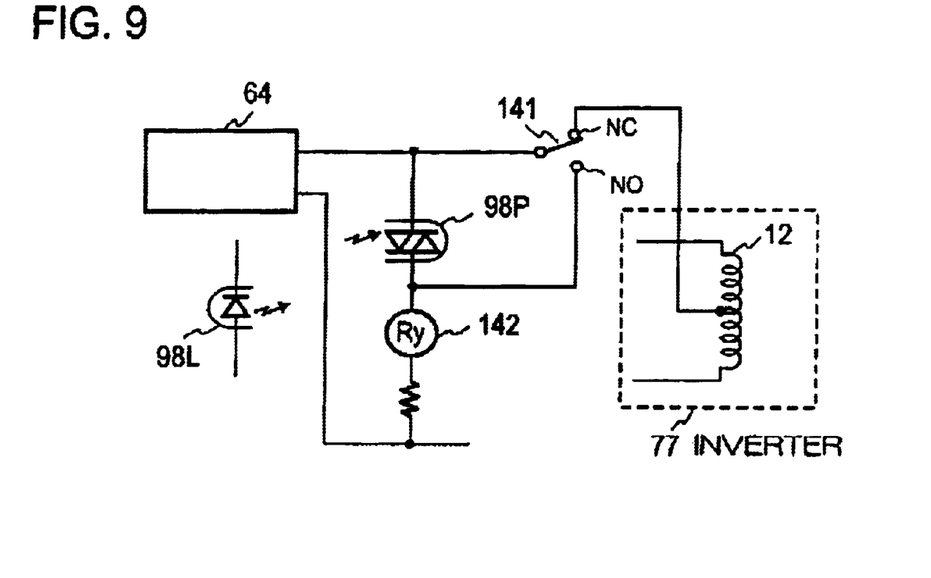
FIG. 9 is an illustration of interrupting a d.c. power to an inverter according to the invention.
Figure 10:
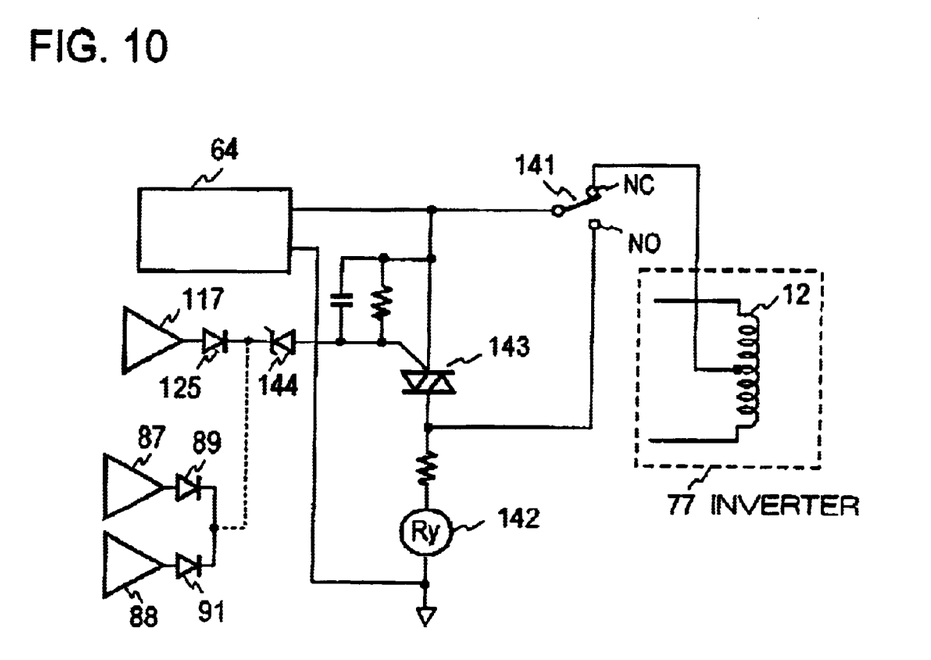
FIG. 10 is another illustration of interrupting a d.c. power to an inverter according to the invention.

The switch 141 can be controlled in response to a ground fault detection output without using the photocoupler 98. For example, referring to FIG. 10 where corresponding parts to those shown in FIG. 9 are designated by like reference numerals as used in FIG. 9, the photo-triac 98P may be replaced by a triac 143, and a ground fault detection output from the detection circuit 10 as shown in FIG. 7, for example, namely, an output from the diode 125 may be passed through a Zener diode 144 to the gate of the triac 143 to render it conductive. As indicated in broken lines in FIG. 10, the ground fault detection output from the detection circuit 10 shown in FIG. 3, or the output from either diode 89 or 91 may be supplied to the gate of the triac 143. The switch 141 may comprise a semiconductor switch.

What is claimed is:

1. A ground fault protection circuit for a lighting circuit which applies a high voltage output from a step-up transformer to a discharge tube to light it, comprising
    a rectifying and smoothing circuit for converting an input a.c. power into a d.c. power;
    an inverter formed by including a primary winding of the step-up transformer for converting the d.c. power into a high frequency power of a frequency higher than the frequency of the a.c. power;
    a first and a second coil through which lead wires extending from the opposite ends of a secondary winding of the step-up transformer to the outside are threaded;
    a detection circuit connected with the first and the second coil for detecting a ground fault occurring on the output side of the secondary winding of the step-up transformer;
    and an interrupter circuit for interrupting the supply of the high frequency power to the secondary winding of the step-up transformer in response to a ground fault detection output from the detection circuit.

2. A ground fault protection circuit according to claim 1 in which the detection circuit comprises
    a first and a second rectifying and smoothing circuit connected to each of the first and the second coil, respectively, for rectifying a high frequency voltage across each of the first and the second coil to convert it into a d.c. voltage;
    a difference circuit connected to the outputs of the first and the second rectifying and smoothing circuit to derive a difference between the rectified and smoothed outputs;
    and a window comparator connected to the difference circuit for delivering a ground fault detection output whenever the output of the difference circuit goes outside a given range.

3. A ground fault protection circuit according to claim 1 in which the detection circuit comprises
    a first and a second rectifying and smoothing circuit connected to the first and the second coil, respectively, for rectifying and smoothing a high frequency voltage across each of the first and the second coil;
    a first and a second comparator connected to the output of the first and the second rectifying and smoothing circuit, respectively, for comparing each rectified and smoothed output against a reference voltage;
    and a circuit for delivering the ground fault detection output from the outputs from the first and the second comparator when at least one of the outputs of the first and the second rectifying and smoothing circuit is less than the reference voltage.

4. A ground fault protection circuit according to claim 1 in which the ends of the first and the second coil which are of a similar polarity are connected together and in which the detection circuit comprises
    a second rectifying and smoothing circuit connected across the other ends of the first and the second coil;
    and a comparator connected to the output of the second rectifying and smoothing circuit for comparing the rectified and smoothed output against a reference voltage and for delivering a ground fault detection output when the former is greater than the latter.

5. A ground fault protection circuit according to claim 1 in which the interrupter circuit ceases the operation of the inverter.

6. A ground fault protection circuit according to claim 1 in which the interrupter circuit interrupts the d.c. power supplied to the inverter.

7. A ground fault protection circuit for a lighting circuit which applies a high voltage output from a step-up transformer to a discharge tube to light it, comprising
    a rectifying and smoothing circuit for converting an input a.c. power into a d.c. power;
    an inverter formed by including a primary winding of the step-up transformer for converting the d.c. power into a high frequency power of a frequency which is higher than the frequency of the a.c. power;

a resistive element connected across a magnetic core of the step-up transformer and a point of common potential;

a detection circuit connected across the resistive element for detecting a ground fault occurring on the output side of the secondary winding of the step-up transformer;

and an interrupter circuit for interrupting the supply of the high frequency power to the secondary winding of the step-up transformer in response to a ground fault detection output from the detection circuit.

8. A ground fault protection circuit according to claim 7 in which the detection circuit comprises a second rectifying and smoothing circuit connected across the resistive element for rectifying and smoothing a high frequency voltage developed across the resistive element, and a comparator connected to the output of the second rectifying and smoothing circuit for comparing the rectified and smoothed output against a reference voltage and for delivering a ground fault detection output when the former is greater than the latter.

9. A ground fault protection circuit according to claim 7 in which the interrupter circuit ceases the operation of the inverter.

10. A ground fault protection circuit according to claim 7 in which the interrupter circuit interrupts the d.c. power supplied to the inverter.

11. A ground fault protection circuit according to claim 7 in which a metal tape is applied to the magnetic core with a conductive adhesive and one end of the resistive element is connected to the magnetic core through the metal tape.

* * * * *